(12) United States Patent
Goujon et al.

(10) Patent No.: US 7,778,114 B2
(45) Date of Patent: Aug. 17, 2010

(54) HOUSING FOR A SEISMIC SENSING ELEMENT, AND A SEISMIC SENSOR

(75) Inventors: Nicolas Goujon, Oslo (NO); Kambiz Iranpour Mobarekeh, Oslo (NO); James Edward Martin, Cottenham (GB); Johan Fredrik Naes, Trondheim (NO); Rune Sindre Voldsbekk, Drammen (NO)

(73) Assignee: WesternGeco L.L.C., Houston, TX (US)

( * ) Notice: Subject to any disclaimer, the term of this patent is extended or adjusted under 35 U.S.C. 154(b) by 887 days.

(21) Appl. No.: 11/063,463

(22) Filed: Feb. 22, 2005

(65) Prior Publication Data

US 2005/0146987 A1    Jul. 7, 2005

(51) Int. Cl.
*G01V 1/16* (2006.01)
*G10K 11/00* (2006.01)

(52) U.S. Cl. ............... 367/188; 367/173; 367/176; 367/177

(58) Field of Classification Search ........... 367/173, 367/176, 177, 188, 7; 181/122, 401, 402
See application file for complete search history.

(56) References Cited

U.S. PATENT DOCUMENTS

| | | | | |
|---|---|---|---|---|
| 3,258,742 | A * | 6/1966 | Sundt et al | 367/187 |
| 3,786,410 | A | 1/1974 | Hazelhurst | |
| 3,825,866 | A | 7/1974 | Piccione | |
| 3,921,755 | A * | 11/1975 | Thigpen | 181/122 |
| 3,930,219 | A | 12/1975 | Kostelnicek | |
| 3,954,154 | A | 5/1976 | Kruppenbach et al. | |
| 4,143,581 | A * | 3/1979 | Smith et al. | 411/337 |
| 4,649,530 | A * | 3/1987 | Porter, Jr. | 367/154 |
| 4,870,625 | A | 9/1989 | Young et al. | |
| 5,022,012 | A | 6/1991 | Godfrey et al. | |
| 5,341,348 | A | 8/1994 | Farris | |
| 5,365,491 | A * | 11/1994 | Sullivan et al. | 367/188 |
| 5,384,751 | A | 1/1995 | Blier et al. | |
| 5,394,379 | A | 2/1995 | Weichart et al. | |
| 5,747,754 | A | 5/1998 | Svenning et al. | |
| 5,838,637 | A * | 11/1998 | Constantinou et al. | 367/173 |
| 5,862,638 | A | 1/1999 | Holland et al. | |
| 6,021,091 | A | 2/2000 | Gaiser | |

(Continued)

FOREIGN PATENT DOCUMENTS

EP    0193215    9/1986

(Continued)

OTHER PUBLICATIONS

UK Search Search Report dated Oct. 4, 2000 for Application No. GB 0020072.5.

*Primary Examiner*—Ian J Lobo

(57) ABSTRACT

A housing for a seismic sensing element (3) for use on the earth's surface comprises connecting means (5) for connecting the housing (3) to a support cable (2) so as to allow relative movement between the sensor housing (3) and the cable (2). This de-couples the sensor housing from the support cable, and improves the fidelity of the sensor.

The connecting means (5) preferably comprises resilient connecting elements, to prevent the transmission of vibrations between the support cable and the sensor housing.

The sensor housing (3) preferably has a flat base (1), so that there is good coupling between the sensor housing and the earth. Alternatively, the sensor housing can be fitted with a base member ((24*a*, 24*b*, 24*c*) that has at least one flat face (26, 26*a*, 26*b*, 26*c*).

23 Claims, 5 Drawing Sheets

U.S. PATENT DOCUMENTS

| | | | |
|---|---|---|---|
| 6,288,972 B1 * | 9/2001 | Norris | 367/16 |
| 6,385,132 B1 | 5/2002 | Sackett | |
| 6,483,776 B1 | 11/2002 | Rokkan | |
| 2004/0008578 A1 * | 1/2004 | Leaney | 367/15 |

FOREIGN PATENT DOCUMENTS

| | | |
|---|---|---|
| EP | 0266138 | 5/1988 |
| EP | 0586828 | 3/1994 |
| SU | 1096592 | 6/1984 |

* cited by examiner

HOUSING FOR A SEISMIC SENSING ELEMENT, AND A SEISMIC SENSOR

Applicant claims priority under 35 U.S.C. §120 from parent application Ser. No. 10/343,868, filed Oct. 8, 2003, now U.S. Pat. No. 7,260,024, which was a 35 U.S.C. §371 national stage filing from Patent Cooperation Treaty application number PCT/GB01/03612, filed Aug. 13, 2001, which in turn claimed priority from Great Britain patent application number 0020072.5, filed Aug. 16, 2000, from which Applicant has claimed foreign priority under 35 U.S.C. §119.

BACKGROUND OF THE INVENTION

1. Field of the Invention

The present invention relates to a housing for a seismic sensing element, and in particular to such a housing intended to be disposed on the earth's surface. The term "earth's surface" as used herein includes the sea-bed, land, and the transition zone. The present invention also relates to a seismic sensor comprising one or more seismic sensing elements disposed within a housing according the present invention.

A seismic sensor intended to be disposed, in use, on the earth's surface generally comprises one or more seismic sensing elements disposed within a housing. When the sensor is disposed on the earth's surface, the coupling of the seismic sensing element(s) to the earth is provided by the housing of the sensor; the housing also provides physical protection for the sensing element(s). Sensors of this general type are used by attaching the sensor housings to a support cable at intervals along the length of the cable. The support cable is provided with electrical leads to enable output signals from the sensors to be transmitted to monitoring and/or recording equipment, and to enable power to provided to the sensors. In the case of sea-bed seismic data acquisition, the cable is then lowered onto the sea-bed to deploy the sensors at their desired locations on the sea-bed.

Sea-bed seismic sensors generally record the pressure and the elastic wavefield of the seismic data. The pressure is a scalar quantity, whereas the elastic wavefield is a vector quantity and it is therefore necessary to measure the components of the elastic wavefield in three non-coplanar directions. The three directions chosen are usually the x-direction (defined as being parallel to the cable, and also known as the "in-line" direction), the y-direction (defined as being perpendicular to the cable, and also known as the "cross-line" direction), and the z-direction (vertical). In total, therefore, four components of the seismic data are measured. Four-component seismic data recording at the sea-bed has proven to be a very successful method for imaging through gas saturated overburdens and for characterising hydrocarbon reservoirs through lithology identification and fluid discrimination. The 3-component data for the elastic wavefield are especially useful, since they enable the separation of the compressional P-waves from the shear S-waves.

2. Description of the Related Art

Reliable interpretation of the elastic wavefield is possible only if the three components of the wavefield are recorded accurately. All of the seafloor multi-component recording systems available to the market today have problems meeting this objective. The principal problem that arises is the infidelity between the in-line (x-direction) and cross-line (y-direction) components of the elastic wavefield. By "infidelity" is meant that one component of the wavefield is recorded more accurately than another component of the wavefield. This problem is illustrated in FIG. 6(a).

Figure 6A:
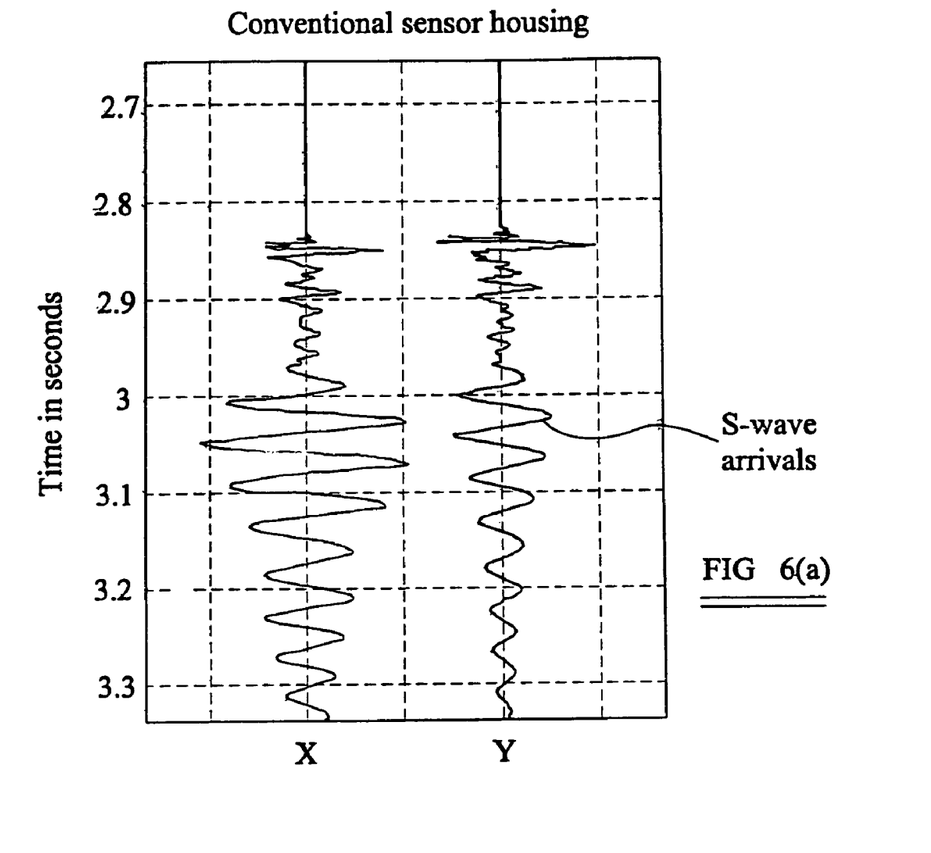
FIG. 6(a) shows the x-component and y-component of seismic data measured using a seismic sensor that incorporates a conventional sensor housing.
Figure 6B:
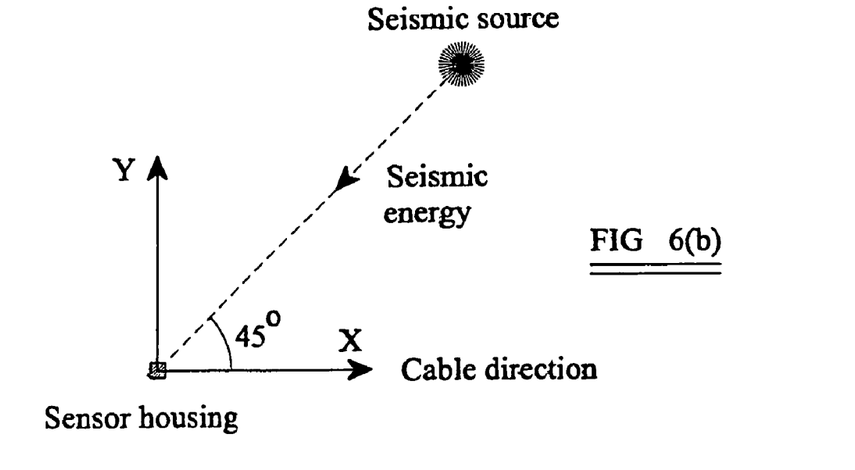
FIG. 6(b) shows the acquisition geometry used to obtain the results shown in FIGS. 3(a), 3(b) and 6(a).

FIG. 6(a) shows the x- and y-components of the elastic wavefield as measured by a conventional four-component sea-bed sensor when seismic energy is incident on the sensor housing at 45° to the cable direction. This acquisition geometry is shown in FIG. 6(b). Since the incident seismic energy makes equal angles to the x-direction and the y-direction, the measured x-component of the elastic wavefield should have an equal amplitude and phase to the measured y-component of the elastic wavefield. It is clear from FIG. 6(a), however, that the measured amplitude of the x-component is significantly larger than the measured amplitude of the y-component of the elastic wavefield for the shear-wave (S-wave) arrivals. Indeed, the seismic coupling between the earth and the seismic sensing elements achieved by some conventional sea-bed sensor housings delivers data with even greater infidelity between the measured x-component and the measured y-component. In some cases, the measured x-component and the measured y-component have a different frequency content. Some prior art sea-bed sensor housings also provide poor and inconsistent fidelity between the measured horizontal and vertical components of the measured seismic data. This infidelity in the sensor response to different components of the wavefield leads to inaccurate survey results when the data is processed.

One approach to overcoming the problem of vector infidelity is to design a deconvolution operator to attempt to correct the measured seismic data for the vector infidelity in measuring the components of seismic data. For example, co-pending UK patent application No 0000900.1 discloses a method of correcting seismic data for vector infidelity by generating a correction factor from data corresponding to one horizontal direction, and using this correction factor to correct data in another horizontal direction. As a further example, J. Gaiser has proposed, in "Compensating OBC data for variations in geophone coupling", Proceedings of 68$^{th}$ Annual Meeting of the Society of Exploration Geophysicists (1998), pp 1429-1432, a deconvolution method for the correction of vector infidelity. In this method, the horizontal components of the measured data are corrected on the assumption that the vertical component (z-component) of the seismic data has been recorded accurately. These approaches each assume that the effects of vector infidelity on the acquired data can be accurately corrected during the processing of the data.

While the technique of applying a deconvolution operator can produce reasonable results if the vector infidelity is small, the distortion of the components of the wavefield during the measurement process is often too large for this technique to work. If the vector infidelity is large, a deconvolution operator can at best simply massage the data so they appear to be more consistent. The only satisfactory way to tackle the problem of sensor infidelity is to record the different components of the elastic wavefield vector with substantially the same accuracy—that is, to record the seismic data with high vector fidelity. If the individual components of the wavefield are recorded accurately, then any residual corrections applied during data processing will be smaller and so can be made more accurately.

SUMMARY OF THE INVENTION

A first aspect of the present invention provides: a housing for a seismic sensing element for use on the earth's surface, the housing comprising: connecting means for connecting the housing to a support cable; and a base that is substantially flat; wherein the maximum extent of the base in a direction parallel to the cable is substantially equal to the maximum extent of the base in a direction perpendicular to the cable.

The provision of the flat base ensures that an adequate surface area of the sensor housing is consistently in contact with the earth's surface when the sensor is deployed, thus providing good seismic coupling between the earth and the housing, and providing good seismic coupling to the seismic sensing element(s) disposed in the housing. Moreover, since the lines of contact in the in-line and cross-line directions are of similar length, the coupling of the housing to the earth's surface is substantially independent of the angle that the incoming seismic energy makes to the cable direction. Thus, a sensor housing of this aspect of the invention makes possible the accurate recording of all components of the incident seismic data.

A second aspect of the present invention provides a housing for a seismic sensor for use on the earth's surface, the housing comprising connecting means for connecting the housing to a support cable so as to allow relative movement between the housing and the cable. According to this aspect of the invention the sensor housing is decoupled from the cable, and this has the consequential effect of decoupling any seismic sensing elements within the housing from the influence of the cable while achieving good coupling of the seismic sensing elements to the earth. The measurements made by the sensor will therefore not be affected by stiffness or tension in the cable, and this eliminates one cause of vector infidelity.

A third aspect of the present invention provides a seismic sensor comprising a housing as defined above and one or more seismic sensing elements disposed within the housing.

Preferred features of the present invention are set out in the dependent claims.

A sensor housing of the present invention, and a seismic sensor of the present invention, may be deployed on any part of the earth's surface, such as the sea-bed, land, or the transition zone.

Preferred embodiments of the present invention will now be described by way of illustrative example with reference to the accompanying figures in which.

BRIEF DESCRIPTION OF THE DRAWINGS

DETAILED DESCRIPTION OF SPECIFIC EMBODIMENTS

Preferred embodiments of the invention will be described with particular reference to a sea-bed seismic sensor. A sea-bed seismic sensor consists essentially of one or more sensing elements disposed within a protective housing. A four-component sensor will generally have four sensing elements, one for sensing the pressure and one each for sensing the three components of the elastic wavefield. Conventional sea-bed seismic sensors generally have a cylindrical housing. In consequence, when the sensor is deployed on the sea bed, only a small area of the sensor housing makes contact with the sea bed. As a result, the seismic coupling between the sea bed and the sensing element(s) is weak, and this weak coupling introduces inaccuracies into the measurements made by the sensor.

According to one aspect of the present invention, therefore, the sensor housing is provided with a flat base. This ensures that there is an adequate contact area between the sensor housing and the earth's surface, so that there is good acoustic coupling to the sensing element(s) mounted within the sensor housing.

Figure 1A:
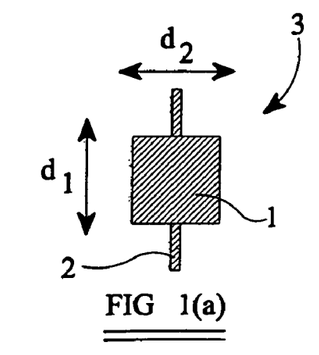
FIGS. 1(a) to 1(e) are plan views of embodiments of sensor housings according to the present invention.

FIG. 1(a) shows a plan view of a sensor housing according to one embodiment of the present invention. The sensor housing 3 is shown attached to a support cable 2. The dimensions of the flat base 1 of the housing 3 are preferably chosen so that the extent $d_1$ of the base 1 in a direction parallel to the cable 2 is similar to the extent $d_2$ in a direction perpendicular to the cable 2. Making the extents $d_1$ and $d_2$ of the base in the in-line and cross-line directions similar to one another minimises the dependence of the acoustic coupling to the sensor housing, and thus to sensing element(s) within the housing, on the angle between the incident seismic energy and the cable. This ensures that the response of the sensor is substantially independent of the direction of incident seismic energy. The sensing element(s) provided within the housing can be any type of seismic sensing element.

In a particularly preferred embodiment, the extent of the base $d_1$ in the in-line direction is equal to the extent $d_2$ in the cross-line direction. For a base having a generally rectangular cross-section in plan view, as shown in FIG. 1(a), this of course means that the base has a square cross-sectional area.

Figure 1B:
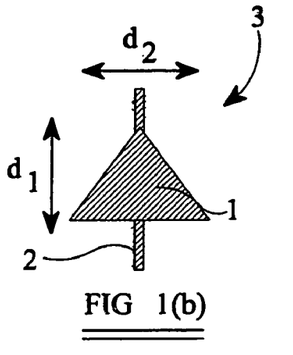
Figure 1C:
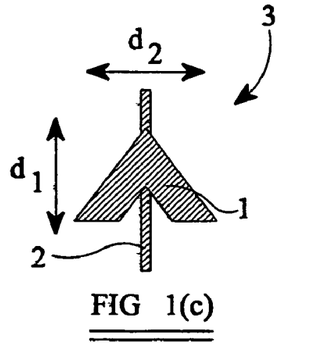
Figure 1D:
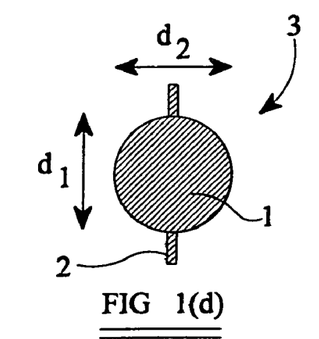
Figure 1E:
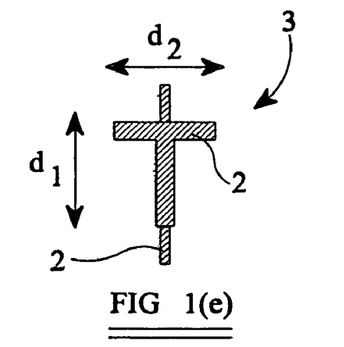

The base is not limited to a rectangular cross-section, and can be any shape in which the extent of the base in the in-line direction is similar to the extent in the cross-line direction. Some examples of possible other shapes for the base of the sensor housing are shown in FIGS. 1(b) to 1(e), which are plan views of sensor housings according to further embodiments of the invention. The sensor housings of these embodiments are each provided with a flat base 1, as in the embodiment of FIG. 1(a). In FIG. 1(b) the base 1 has a triangular cross-section, and in FIG. 1(c) the base has a V-shaped cross section. The V-shape can be fixed, or alternatively the base can be formed by variable geometry "wings" so that the V-shape can be made by extending the wings from a cylindrical sensor housing once the sensor housing has been deployed; this is more convenient for storing the cable or winding the cable on a winch. In FIG. 1(d) the cross-section of the flat base of the housing is elliptical, and would be circular for the case $d_1=d_2$. Finally, in FIG. 1(e) the flat base has a T-shaped cross-section. For each of FIGS. 1(b) to 1(e) it is preferable that $d_1$ is substantially equal to $d_2$.

As noted above, one aspect of the invention is to provide improved coupling between the sensor and the sea-bed. A second aspect of the invention is to de-couple the sensor from the support cable. Mechanically de-coupling the sensor from the support cable is advantageous, for two reasons. Firstly, if the cable is rigidly coupled to the sensor housing, then the mechanical interaction between the cable and the sensor housing can affect the measurement results of the sensor. It is likely that the mechanical interaction would have different effects on the results of measuring different components of the wavefield, thus causing infidelity in the sensor response. Secondly, if the sensor housing is rigidly coupled to the cable, then any tension in the cable can reduce the coupling force between the sensor housing and the sea-bed, and can even pull the sensor completely off the sea-bed. While these effects can, to some extent, be reduced by minimising the tension in the cable during deployment, it is difficult to lay a cable on the sea-bed without there being some residual tension in the cable. De-coupling the sensor housing from the cable means that any residual tension in the cable does not affect the measurement results of the sensor. Moreover, as noted above there are typically a large number of sensors on a single cable, and de-coupling the housing of each sensor from the cable has the consequent effect of de-coupling each sensor from the other sensors mounted on the cable.

It is preferred that a sensor housing incorporates both above-mentioned aspects of the invention. However, the two aspects are essentially independent from one another, and it is in principle possible for a sensor housing to incorporate only one of the two aspects of the invention.

Figure 2A:
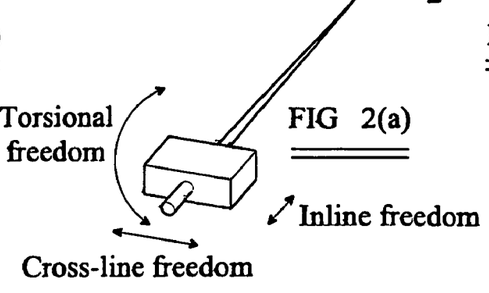
FIG. 2(a) is a schematic perspective view of a sensor housing of the present invention attached to a cable.

To accomplish effective mechanical de-coupling of the sensor housing from the cable, the connecting means provided on the sensor housing to connect the sensor housing to the cable are arranged to allow relative movement between the sensor housing and the cable in at least one direction or sense. Relative motion between the sensor housing and the cable is possible in three directions or senses:—namely, relative motion parallel to the direction of the cable (in-line freedom); movement of the sensor housing perpendicular to the direction of the cable (cross-line freedom); and rotational movement of the sensor housing around the axis of the cable (torsional freedom). These are illustrated in FIG. 2(a). According to this aspect of the invention, a sensor housing is provided with connecting means that allow relative motion between the sensor housing and the cable to occur in at least one, and preferably in more than one, of the directions and senses shown in FIG. 2(a).

Figure 2B:
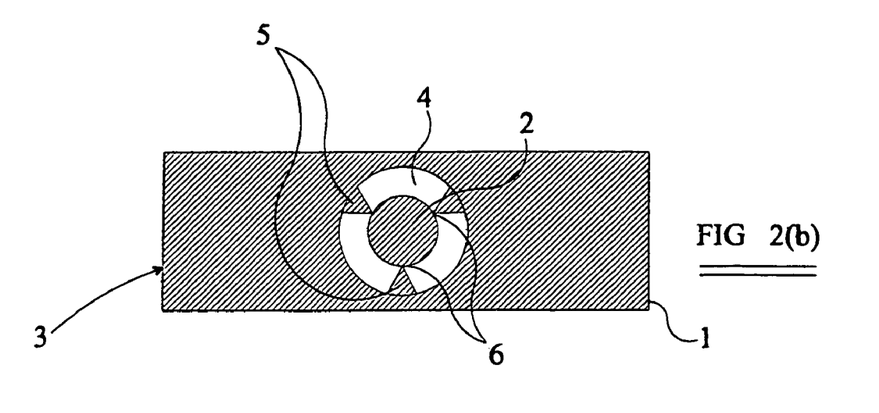
FIG. 2(b) is a cross-section through the sensor housing of FIG. 2(a)

FIG. 2(b) is a cross-section through a sensor housing 3 according to one embodiment of the present invention. One or more sensing elements (not shown) may be disposed within the housing 3 to produce a seismic sensor. The sensor housing 3 is provided with an aperture 4 through which a support cable 2 is received.

The sensor housing has connecting means, which serve to connect the sensor housing 3 to the cable 2. In FIG. 2(b) these connecting means consist of a plurality of connecting elements 5 that are attached to the housing 3. The free ends 6 of the connecting elements 5 bear lightly against the exterior of the cable 2. Because the connecting elements 5 bear only lightly on the cable 2, the sensor housing 3 is able to move relative to the cable in an in-line direction, and is also able to rotate about the axis of the cable. Connectors having the general form shown in FIG. 2(b) allow relative movement between the sensor housing and the cable. A further advantage of the invention is that, when the cable is deployed, the sensor housing is able to rotate about the cable so as to orient itself to the contours of the earth's surface. This ensures that the contact area between the base 1 of the sensor housing and the earth's surface is as large as possible.

The base 1 of the sensor housing 3 is preferably flat. The extent of the base in the in-line direction is preferably equal, or substantially equal, to the extent in the cross-line direction.

In a preferred embodiment of this aspect of the invention, the sensor housing is provided with damping elements to prevent mechanical interaction between the cable and the sensor housing. For example, the damping elements should prevent the transmission of vibrations from the cable to the sensor housing. In principle, the damping elements can be separate from the connecting elements, but in a particularly preferred embodiment of this aspect of the invention the connecting elements also function as damping elements. This can be achieved by, for example, connecting the cable to the sensor housing using resilient connecting elements, to minimise mechanical coupling between the cable 2 and the sensor housing. Thus, in the embodiment of FIG. 2(b) the connecting elements 5 are preferably resilient connecting elements. The use of resilient connecting elements will eliminate, or at least significantly reduce, mechanical interaction between the cable 2 and the sensor housing 3, and will also damp vibrations that would otherwise have been transmitted from the cable 2 to the sensor housing 3.

Means are preferably provided to limit the relative movement of the sensor housing 3 relative to the cable. This can be done, for example, by providing stops on the cable 2 to limit the rotational and/or in-line movement of the sensor housing 3 relative to the cable 2.

In order to reduce friction between the coupling means 5 and the cable 2, it is preferred that the free ends 6 of the coupling means 5 have a low surface area. In the embodiment of FIG. 2(b) this is achieved by providing the connecting elements 5 with a small cross-sectional area at their free ends 6, to minimise the contact area between the connecting elements 5 and the cable 2.

In the embodiment of FIG. 2(b) three connecting elements 5 are provided, spaced at 120° intervals around the circumference of the aperture 4. However, the invention is not limited to exactly three connecting elements, and it would be possible to provide four or more connecting elements 5. The connecting elements 5 can be formed of any suitable material that will withstand immersion in water, particularly immersion in sea-water. If the connecting elements 5 are resilient, they can be formed of, for example, springs such as coil springs, or an elastic material.

Figure 3A:
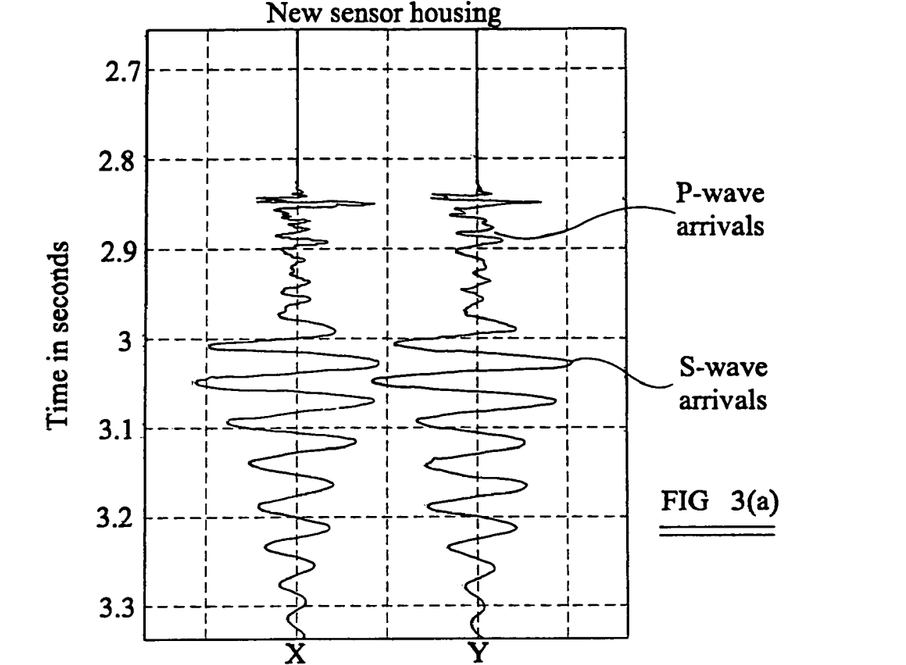
FIG. 3(a) shows the x-component and y-component of seismic data measured by a seismic sensor that incorporates a sensor housing according to an embodiment of the present invention.

FIG. 3(a) shows results obtained using a sensor having a housing according to the present invention. The housing has the general construction shown in FIG. 2(b), and has a square cross-sectional area for the base as shown in FIG. 1(a). The results of FIG. 3(a) were obtained for seismic energy incident on the sensor housing at an angle of 45° to the cable direction—that is, using the acquisition geometry of FIG. 6(b).

It will be seen that the measured amplitudes of the shear-wave seismic energy in the y-direction in FIG. 3(a) are significantly larger than the measured amplitudes of the seismic energy in the y-direction in FIG. 6(a) which were recorded using a sensor having a conventional cylindrical housing. It may also be seen that the measured amplitudes of the seismic energy in the x-direction in FIG. 3(a) are slightly smaller than the measured amplitudes of the seismic energy in the x-direction in FIG. 6(a). Because of these changes, the measured amplitude of the shear-wave arrival in the x-direction is approximately equal to the measured amplitude of the shear-wave arrival in the y-direction in FIG. 3(a), as should be the case. This is in contrast to the results for a prior art sensor illustrated in FIG. 6(a), in which the measured amplitude of the shear-wave arrival in the y-direction is significantly less than the measured amplitude in the x-direction. It can thus be seen that a sensor housing according to the present invention yields seismic data having a greater vector fidelity than conventional sea-bed sensor housings.

Figure 3B:
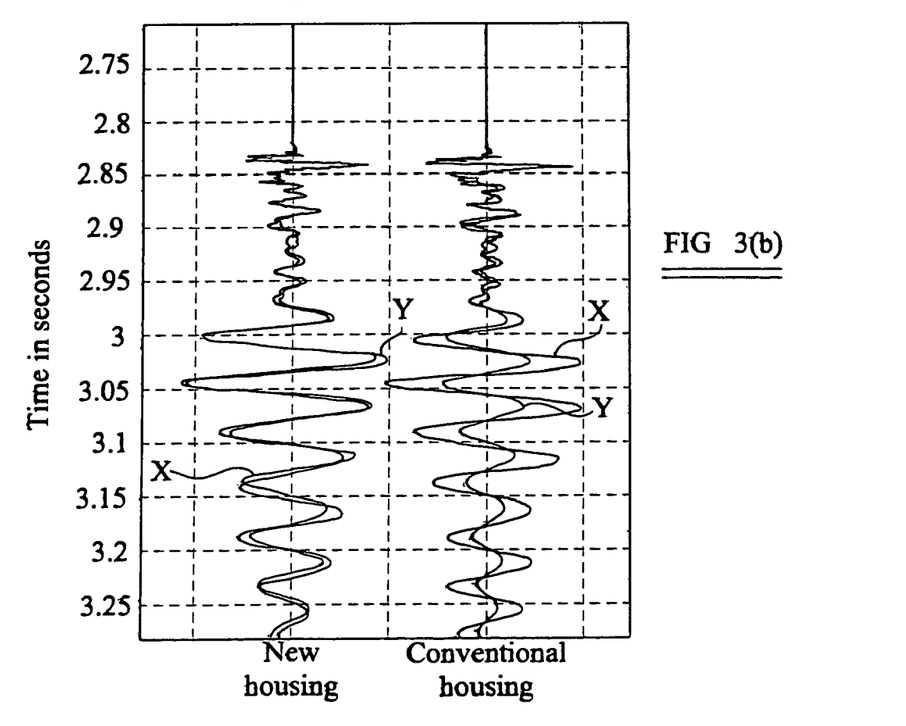
FIG. 3(b) is a comparison between data acquired by a seismic sensor that incorporates a sensor housing according to an embodiment of the present invention and data acquired by a seismic sensor that incorporates a conventional sensor housing.

FIG. 3(b) is a further illustration of the improved vector fidelity of seismic data acquired by a sensor that has a housing according to the present invention. The left-band trace in FIG. 3(b) shows the measured amplitudes of seismic data acquired using a sensor having a housing of the present invention, with the amplitudes in the x- and y-directions superposed on one-another. The right band trace in FIG. 3(b) shows the measured amplitudes of seismic data acquired using a sensor having a conventional cylindrical housing, again with the amplitudes in the x- and y-directions superposed on one-another. That is, the left-hand trace of FIG. 3(b) is a superposition of the two traces of FIG. 3(a), whereas the right-hand trace of FIG. 3(b) is a superposition of the two traces of FIG. 6(a). FIG. 3(b) clearly shows that the x- and y-components of the shear-wave arrivals are recorded with vastly improved vector fidelity by a sensor having a housing according to the present invention than by a sensor having a conventional housing.

The connecting means illustrated in FIG. 2(b) allows the sensor housing 3 to move relative to the cable 2 in a direction parallel to the cable, and also allows the sensor housing to rotate about the axis of the cable. It is also possible to provide the sensor housing 3 with freedom to move relative to the cable 2 in a direction perpendicular to the cable, if this is desired. This can be achieved by, for example by reducing the length of the connecting elements 5.

In order to maximise the coupling between the sea-bed and the sensor housing, the overall weight of the sensor should be made sufficiently large to ensure that there is a good contact area between the base 1 of the sensor housing and the sea-bed. The weight that is required will depend on the nature of the sea bed where the sensor is to be used, with a soft sea-bed requiring a lower overall weight of the sensor housing than a hard sea-bed.

Mechanical interactions between the cable 2 and the sensor housing 3 can also be minimised by ensuring that the weight per unit length of the cable is as small as possible, commensurate with the cable having the required mechanical strength. The cross-cable rigidity of the cable should also be made as low as possible. Furthermore, when the cable is being deployed, care should be taken to ensure that the in-line tension in the cable is as low as possible.

A second embodiment of a sensor housing according to the present invention will be described with reference to FIGS. 4(a) to 4(b). In this embodiment, the sensor housing 9 consists of a first housing 10 and a second housing 11. The first housing 10 is intended to contain four sensing elements (not shown), for sensing the pressure and the three components of the elastic wavefield, and the second housing 11 is intended to contain electronic circuits associated with the sensing elements, for monitoring the sensing elements and processing their output signals. The electrical and electronic connections between the first housing 10 and the second housing 11 are enclosed in a water-tight tube 12 for protection.

The first and second housings 10, 11 are secured to the cable 2 by means of a clamp 13. The clamp 13 is in the form of an annulus, and, in use, is clamped to the cable 2 with the cable 2 passing through the interior of the clamp 13. The first and second housings 10, 11 are secured to the clamp 13 by means of, firstly, resilient bands 14 and, secondly, a locking member 15. The locking member 15 is secured to the clamp 13, and bears against two spacer members 16. One spacer member is secured to the first housing 11 and one spacer member is secured to the first housing 12. The use of resilient bands 14 to connect the first and second housings 10, 11 to the clamp ensures that the first and second housing 10, 11 are mechanically de-coupled from the clamp, so that vibrations of the cable are not transmitted to the housings. Furthermore, the use of resilient bands 14 to attach the housings 10, 11 to the clamp 13 allows the housings 10, 11 to move relative to the clamp 13, and hence to move relative to the cable. The housings 10,11 can preferably move relative to the cable 2 in both the in-line and the cross-line directions.

A spacer member 16 is provided approximately mid-way along each of the housings 10, 11, and another spacer member 17 is provided at the end of the sensor adjacent the clamp 13. The spacer members 16,17 hold the first housing 11 and the second housing 12 at a substantially constant distance from the second housing 11. The locking member 15 retains the spacer members 16 in their correct position along the cable.

The second housing 11 is provided with an electrical socket at its end away from the tube 12. An electrical connector 18 can plug into the socket, to allow the output signals to be connected to the cable 2 via a flexible lead 19.

Figure 4A:
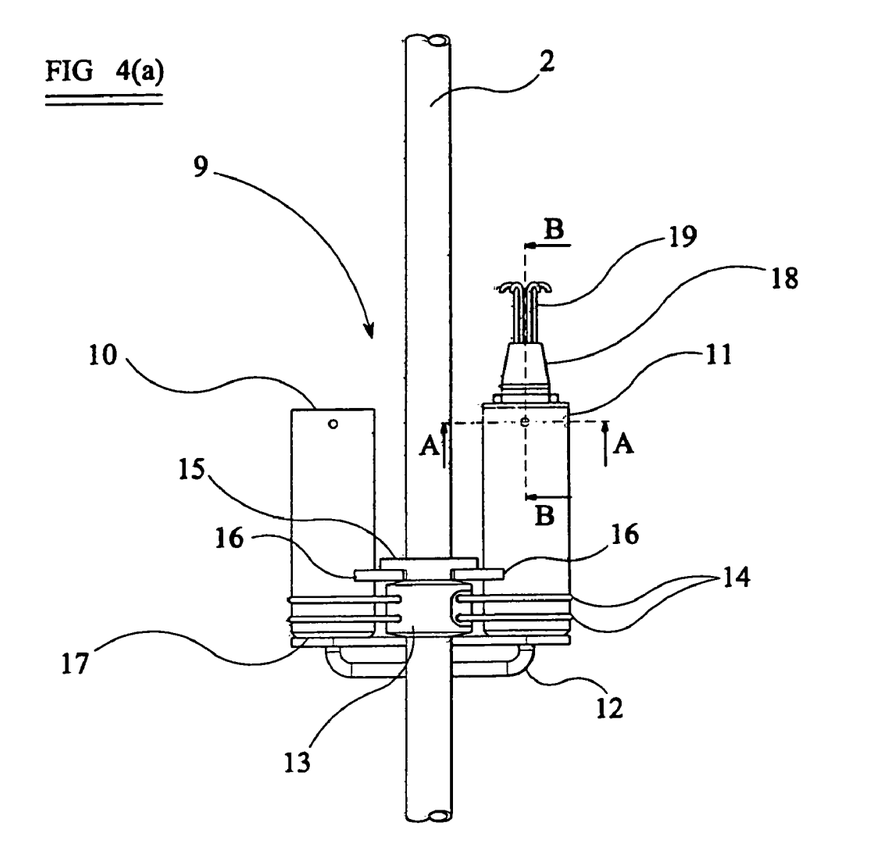
FIG. 4(a) is a schematic view of a sensor housing according to a further embodiment of the present invention.
Figure 4B:
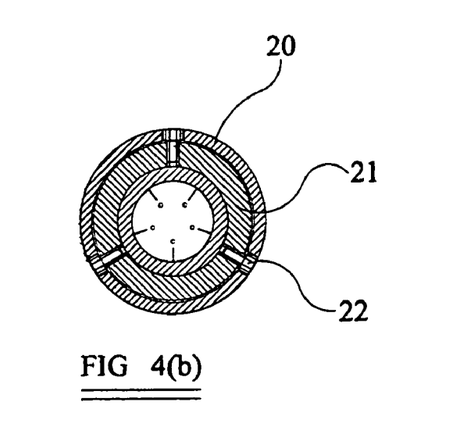
FIG. 4(b) is a cross-section through the sensor housing of FIG. 4(a) along the line AA.
Figure 4C:
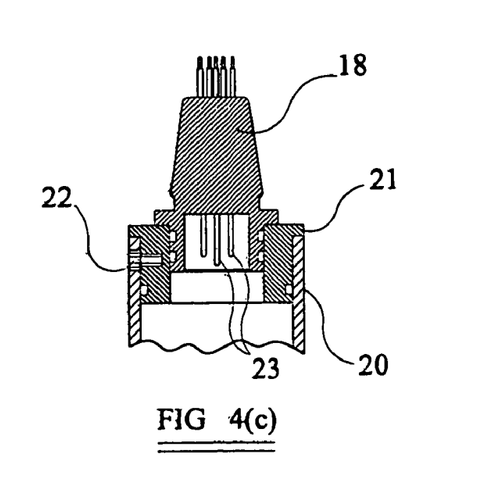
FIG. 4(c) is a cross-section through the sensor housing of FIG. 4(a) along the line BB.
Figure 4D:
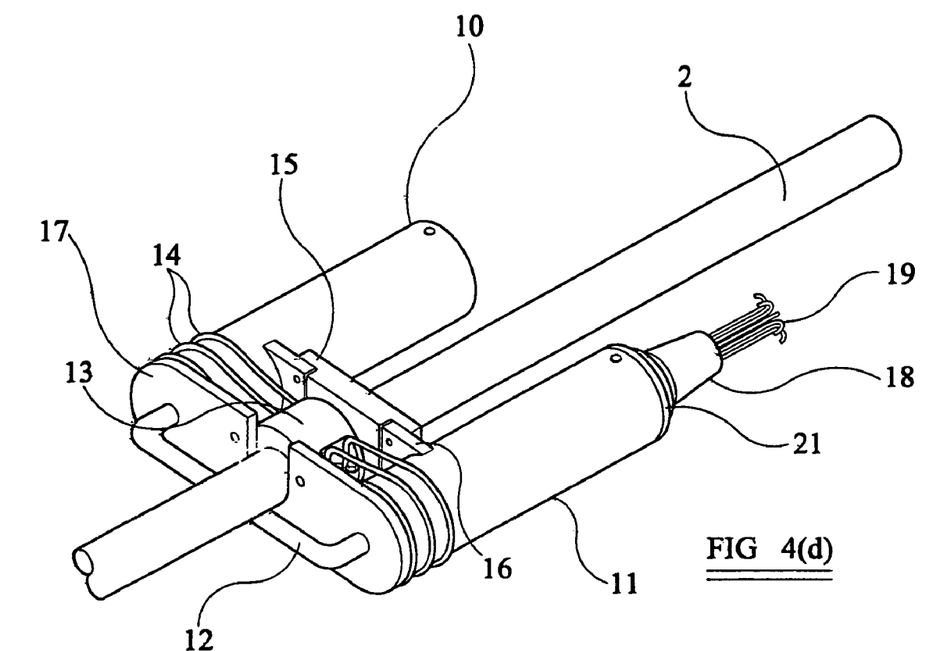
FIG. 4(d) is a schematic perspective view of the sensor housing of FIG. 4(a)

The structure of the second housing 11 is shown in detail in FIGS. 4(b) and 4(c). It will be seen that the housing is formed of a cylindrical wall 20, which can be made of any material that is water-resistant and has sufficient structural strength to protect the contents of the housing. A flanged annular insert 21 is inserted into the end of the housing 11 away from the tube 12, and is secured to the cylindrical wall 20. In the embodiment of FIGS. 4(b) and 4(c) the annular insert 21 is secured to the wall 20 by means of three screws 22 arranged at 120° intervals around the circumference of the cylindrical wall 20, but the invention is not limited to this particular method of fastening the insert 21 to the cylindrical wall 20 and any suitable fastening means can be used.

The plug 18 fits into the annular insert 21 so as to provide a water-tight seal between the plug 18 and the insert 21. The plug 18 is provided with electrical connectors 23 that engage with complementary electrical connectors (not shown) provided within the housing 11.

When a sensor that has a sensor housing according to FIGS. 4(a)-4(d) is mounted on a support cable it will have an overall centre of mass that is close to the symmetry axis of the cable, since the first and second housings 10, 11 will be disposed one on either side of the cable 2. If the first and second housings have approximately the same overall mass (by "coverall mass" is meant the sum of the mass of one of the housing 10, 11 and the mass of the contents of that housing), then they are preferably arranged at equal distances from the symmetry axis of the cable 2.

Making the overall centre of mass of the sensor coincident, or nearly coincident, with the symmetry axis of the cable prevents unwanted rotational movement of the sensor housing, and thus facilitates de-coupling the sensor housing 9 from the cable 2.

In order to provide good coupling between the sensor housing 9 of FIG. 4(a) and the earth's surface, the sensor housing is preferably provided in use with an outer cover (not shown) that increases the contact area with the earth's surface. The outer cover could have the general form of the base members 24a, 24b, 24c described below with reference to FIGS. 5(a) to 5(c). If the sensor housing is provided with a cover, the contact surface of the cover (that is, the area of the cover that is intended to come into contact with the earth's surface when the sensor housing is deployed) preferably has a cross-line extent that is substantially equal to the in-line extent, to ensure that the response of the sensor is substantially independent of the direction of incident seismic energy as described above with regard to FIGS. 1(a) to 1(e).

Figure 5A:
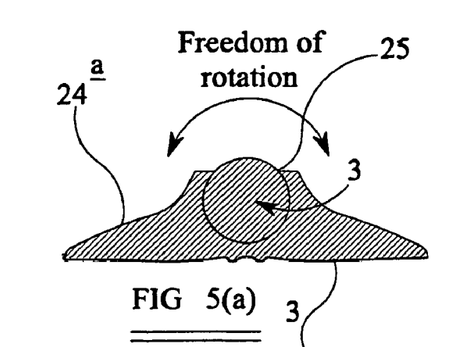
FIG. 5(a) is a schematic sectional view of a sensor housing according to another embodiment of the present invention.
Figure 5B:
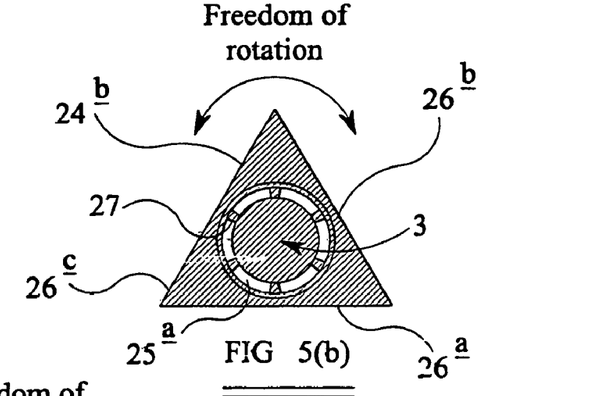
FIG. 5(b) is a schematic sectional view of a sensor housing according to a further embodiment of the present invention.
Figure 5C:
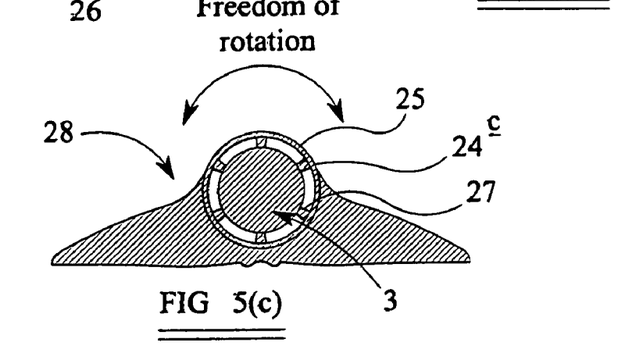
FIG. 5(c) is a schematic sectional view of a sensor housing according to a further embodiment of the present invention.

Further embodiments of a sensor housing according to the present invention are illustrated in FIGS. 5(a)-5(c). These embodiments relate to a way in which a conventional sensor housing can be modified to improve seismic coupling between the housing and the earth's surface and, in these embodiments, the sensor housing 3 is generally cylindrical in shape. The coupling between the sensor housing 3 and the sea-bed is improved by mounting the sensor housing 3 in a base member 24a, 24b, 24c.

In the embodiment of FIG. 5(a) the base 24a has a recess 25 for receiving the sensor housing. In FIG. 5(a), the sensor housing 3 is a loose clip fit into the recess 25 in the base 24a, so that the sensor housing 3 is retained in the recess 25 but is able to rotate relative to the base 24a.

The lower face 26 of the base 24a is shaped and dimensioned so as to provide good coupling between the sensor and the sea bed. This is done, for example, by making the lower face 26 of the base substantially flat, and of sufficient area to provide good coupling between the sea-bed and the base 24a. The exact shape and size of the base 24a, and the material(s) used to manufacture the base 24a, can be chosen depending on the expected conditions of the sea-bed where the sensor is to be used, or to enhance the coupling to the sensor housing when the sensors are deployed in prepared trenches in the sea-bed. Thus, this aspect of the present invention allows a conventional sensor having a cylindrical sensor housing to be provided with good coupling between the sea-bed and the sensor in a wide range of sea-bed conditions.

A further advantage of providing a sensor housing with a base such as that shown in FIG. 5(a) is that this will lower the centre of gravity of the combined base and sensor housing assembly. This helps to ensure that the base is correctly located beneath the sensor housing as the cable is deployed.

The lower face 26 of the base 24a is preferably not completely flat and smooth. The coupling between the earth's surface and the base 24a is improved if the lower face 26 of the base 24a is rough, for example like the sole of a boot, and the lower face 26 of the base 24a may, for example, be textured or provided with protrusions to improve coupling to the earth's surface. The base 24a may also be made of a material having a high coefficient of friction, since this will also improve the coupling to the earth's surface.

FIG. 5(b) shows a modification of the sensor of FIG. 5(a). In the embodiment of FIG. 5(b), the base 24b is provided with three flat faces 26a, 26b, 26c. The base is provided with an aperture 25a for receiving a sensor housing, and the faces 26a, 26b, 26c of the base 24b are arranged to be symmetrical about the aperture 25a.

The embodiment of FIG. 5(b) minimises the risk of there being poor coupling between the sensor housing and the sea-bed. Although, as noted above with respect to FIG. 5(a), the force of gravity should tend to ensure that the base 24a of FIG. 5(a) remains below the sensor housing as the sensor and cable are lowered to the sea-bed, there is a residual risk that the base 24a could be inadvertently inverted during deployment so that the face 26 of the base 24a does not come into contact with the sea-bed. In the embodiment of FIG. 5(b), however, the provision of three flat faces 26a, 26b, 26c ensures as far as is practicable that, when the base 24b comes into contact with the sea-bed during deployment of the cable, the base will orient itself such that one of the flat faces 26a, 26b, 26c is in contact with the sea-bed, thus ensuring that good coupling is obtained. Although the base 24b is provided with faces 26a, 26b, 26c that are flat, the faces of the base 24b could alternatively be rough to improve coupling to the earth's surface, as described above with regard to FIG. 5(a).

In FIG. 5(b), the base 24b is shown as being provided with bearings 27 to ensure that the sensor housing 3 is able to rotate freely about the base 24b. These bearings can, for example, be similar to the resilient connecting means 5 shown in FIG. 2(b).

A further embodiment of the present invention is shown in FIG. 5(c). In this embodiment the sensor housing is again received in a base 24c that is generally similar to the base 24a shown in FIG. 5(a), except that the sensor housing 3 is not a clip-fit into the base 24c. Instead, the base 24c is provided with bearings 27, and a quick-release coupling mechanism 28 is provided to retain the sensor housing in the recess 25.

In the embodiments shown in FIGS. 5(a) to 5(c) the sensor housing is able to rotate freely relative to the base 24a, 24b, 24c. It is therefore necessary for the sensor housing itself to have freedom of movement relative to the cable only in the in-line and cross-line directions to allow complete de-coupling of the sensor housing from the cable. Relative movement between the housing and the cable in the in-line direction and/or the cross-line direction can be made possible by, for example, providing the housing with connecting means similar to those shown in FIG. 2(b).

As noted above, the embodiments of FIGS. 5(a) to 5(c) have the advantage that a conventional sensor having a cylindrical housing can be provided with improved coupling between the sensor housing and the sea-bed. Furthermore, a number of different bases can be manufactured, each being adapted to particular sea-bed conditions. Thus, one sensor can be adapted to provide a given quality of coupling to the sea-bed in a wide range of sea-bed conditions, simply by removing one base and fitting another.

A further advantage of the embodiments of FIGS. 5(a) to 5(c) is that most of the wear that occurs during the coupling, deployment and retrieval operations would be absorbed by the base 24a, 24b, 24c rather than by the sensor housing 3. Thus, providing the base 24a, 24b, 24c will protect the sensor housing 3 and increase the robustness of the data acquisition system. If a base is damaged it can simply be discarded, since the cost of a base is low compared to the cost of a sensor, and the sensor housing fitted with a replacement base.

A further advantage of providing a sensor housing with a base is that, as noted above, this will lower the centre of gravity of the combined base and sensor housing assembly, and this helps to ensure that the base is correctly located beneath the sensor housing as the cable is deployed.

As noted above, the size and shape of, and the material(s) for, the base can be chosen depending on the expected sea-bed conditions, to produce good-coupling between the sensor housing and the sea-bed. The shape and size of the base can also be designed to minimise the effect of water currents near the sea-bed on the stability of the sensor. By designing the base to minimise hydro-dynamic effects of this type, the noise level in the sensor output can be reduced.

In the embodiments of FIGS. 5(a) to 5(c), the base can be made of any suitable material that will withstand immersion in water. It is preferred that the base is made of a rubber or plastics material, since this allows the base to be manufactured easily at low cost, and also provides a robust base. Furthermore, using a resilient material to form the base will provide greater mechanical protection for the sensor housing in the case of, for example, impacts with under-water objects as the cable is being deployed. The base preferably has an overall density greater than the density of water.

The present invention is particularly suited for application to sensors that contain four sensing elements, one for measuring the pressure and three for measuring three non-coplanar components, such as the x-, y- and z-components, of the elastic wavefield. The invention can in principle be applied to sensors having more or fewer than four sensing elements.

The preferred embodiments of the invention have been described with reference to housings for sensors that are intended to be deployed on the sea-bed. The invention is not limited to sea-bed seismic sensors, however, but can also be applied to sensors that are intended to be deployed on land or on the transition zone.

The invention claimed is:

1. A housing for a seismic sensing element for use on the earth's surface, the housing comprising:
   means for connecting the housing to a support cable so as to allow relative movement between the housing and the cable, and
   means for damping the transmission of vibrations between the cable and the housing.

2. The housing of claim 1 wherein the connecting means are the damping means.

3. The housing of claim 1 comprising a base that is substantially flat and comprises two or more substantially flat faces arranged substantially symmetrically with respect to an axis of rotation of the base about the cable, wherein the maximum extent of the base in a direction parallel to the cable is substantially equal to the maximum extent of the base in a direction perpendicular to the cable.

4. The housing of claim 3 wherein the base is integral with the housing.

5. The housing of claim 3 wherein the housing is detachably received in the base.

6. The housing of claim 3 wherein the base is selected to have a high coefficient of friction against the earth's surface.

7. The housing of claim 3 wherein the base is roughened.

8. The housing of claim 5 wherein the housing is rotatable with respect to the base when the housing is received in the base.

9. The housing of claim 3 wherein the connecting means allows relative movement between the housing and the cable in a direction parallel to the cable.

10. The housing of claim 3 wherein the connecting means allows relative movement between the housing and the cable in a direction perpendicular to the cable.

11. The housing of claim 5 wherein the base is adapted to be clip-fit onto the housing.

12. The housing of claim 5 wherein the housing and/or the base comprise retaining means for retaining the base on the housing.

13. The housing of claim 12 wherein the retaining means comprises a quick release coupling.

14. The housing of claim 1 wherein the housing is arranged substantially symmetrically with respect to an axis of rotation of the housing about the support cable.

15. The housing of claim 1 wherein the damping means comprises at least one resilient element disposed between the housing and the cable.

16. The housing of claim 1 further comprising at least one seismic sensing element disposed within the housing.

17. The housing of claim 16 wherein four seismic sensing elements are disposed within the housing, a first sensing element being for measuring the pressure and the second to fourth sensing elements being for measuring three non-coplanar components of the elastic wavefield.

18. The housing of claim 16 wherein, in use, the center of mass of the sensor is substantially co-incident with the axis of a support cable.

19. A seismic sensor comprising a housing, the housing comprising connecting means for connecting the housing to a support cable so as to allow relative movement between the housing and the cable, the housing including damping means for restricting the transmission of vibrations between the cable and the housing.

20. The seismic sensor of claim 19 wherein the connecting means are the damping means.

21. The seismic sensor of claim 19 and at least one seismic sensing element disposed within the housing.

22. The seismic sensor of claim 21 wherein four seismic sensing elements are disposed within the housing, a first sensing element being for measuring the pressure and the second to fourth sensing elements being for measuring three non-coplanar components of the elastic wavefield.

23. The seismic sensor of claim 21, wherein, in use, the center of mass of the sensor is substantially co-incident with the axis of a support cable.

* * * * *